United States Patent Office 2,727,048
Patented Dec. 13, 1955

2,727,048

CATALYTIC HYDROGENATION OF EPOXIDIZED OLEFINIC COMPOUNDS

Charles H. Mack and William G. Bickford, New Orleans, La., and Klare S. Markley, Rockville, Md., assignors to the United States of America as represented by the Secretary of Agriculture No Drawing. Application November 10, 1952, Serial No. 319,800

3 Claims. (Cl. 260—409)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a process of converting epoxy groups

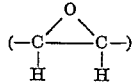

to hydroxyethylene groups

More particularly this invention provides a process of catalytically hydrogenating mono- and poly-epoxides of acids and esters that, prior to epoxidation, contained an unsaturated long chain aliphatic group to produce the corresponding mono- or poly-hydroxy compounds. The hydroxy compounds produced from the poly-epoxides are particularly valuable in that they are polyhydroxy compounds in which the hydroxyl groups are attached to non-adjacent carbon atoms, compounds which can only be produced with considerable difficulty by other methods.

In general according to this invention at least one epoxide of an acid or ester that, prior to epoxidation, contained at least one olefinically unsaturated aliphatic radical of at least 4 carbon atoms is mixed with enough of a liquid alkanoic acid, a liquid alkanoic acid anhydride or mixtures of such acids and/or anhydrides to form a solution of realtively low viscosity. The resultant solution is then contacted with hydrogen in the presence of palladium dispersed on carbon particles suspended in the solution as a catalyst until reaction occurs.

The epoxides of acids or esters that, prior to epoxidation, contained olefinically unsaturated aliphatic radicals of at least 4 carbon atoms can suitably be prepared by a variety of methods. Methods of producing them from compounds containing at least one mono- or poly-olefinically unsaturated aliphatic radical of at least 4 carbon atoms in which the unsaturated radicals are cis, trans, or mixtures thereof are described in patents such as U. S. 2,458,484, 2,567,930, and 2,569,502. These methods involve reacting the unsaturated compounds with a peracid dissolved in a liquid alkanoic acid or acid anhydride.

A unique advantage of the present invention is that the crude epoxides prepared by processes such as those mentioned above can suitably be used as the starting material for the process of this invention. The crude epoxides are preferably freed of unreacted unsaturated compounds and peracids prior to such use. The present invention thus makes it possible to convert the unsaturated compounds to saturated hydroxy compounds by a two-step process in which the products of the first step are used substantially per se as the starting materials for the second step.

Liquid alkanoic acids or acid anhydrides suitable for employment in the present process are thermally stable, water-soluble liquid alkanoic acids, i. e., acetic acid, propionic acid, the butanoic acids, the pentanoic acids, the anhydrides of such acids, and mixtures of the acids and/or anhydrides. The use of acetic acid or acetic anhydride or mixtures thereof is preferred.

The amount of liquid alkanoic acid or acid anhydride used can suitably be varied widely. Amounts of from about 0.1 to 50 parts by weight per part of epoxy compound are preferred. Particularly suitable results have been obtained by the use of about two parts by weight of acetic acid, of acetic anhydride, or of mixtures thereof.

Where a liquid alkanoic acid is used, the acid, or the solution of the epoxy compound in the acid, can suitably contain minor amounts of water. The amount of water so contained is preferably less than enough to cause a mixture of the epoxy compound with about two parts of the acid used to exist as two immiscible liquid phases at the reaction temperature to be used.

Catalysts suitable for employment are hydrogenation catalysts consisting essentially of finely divided palladium dispersed on particles of carbon. Such catalysts preferably contain from about 1 to about 10 parts by weight of palladium per 100 parts of carbon. Charcoal, preferably activated charcoal, impregnated with from about 5 to about 10 parts of finely divided palladium is a particularly suitable catalyst.

The amount of catalyst used can suitably be varied widely. The amount of catalyst can suitably be one which presents as little as 0.001 part of palladium per part of epoxide. The use of an amount presenting about 0.01 part of palladium is particularly suitable. Up to a readily determinable maximum, the use of more catalysts in a given catalytic reaction increases the rate and extent of reaction, but the use of more than that maximum amount of catalyst provides little if any advantage. In general, in the present process, using more than the amount of catalyst presenting about 0.1 part of palladium per part epoxide provides but little advantage.

In the present process the catalyst can suitably be isolated from the reaction mixture by conventional mechanical means such as filtration and can be reused a number of times. Generally the isolated catalyst can be reused without purification or repreparation.

The hydrogenation can suitably be conducted under pressures above or below atmospheric pressure. Pressures of from about 1/15 to about 5 atmospheres are preferred and the use of normal atmospheric pressure is particularly preferred.

The hydrogenation can suitably be conducted at any temperature above the freezing point of the epoxide-alkanoic acid or anhydride solution but below the thermal decomposition temperature of any of the reactants or products. Temperatures ranging from about 20° C. to about 100° C. are preferred, particularly where the reaction is conducted under atmospheric pressure, and the use of normal room temperature is particularly preferred.

The hydrogenation can suitably be conducted in a continuous or non-continuous manner.

In this hydrogenation process, the hydrogen selectively reacts with the epoxy group. The reduction of all of the epoxy groups present in the epoxide used can suitably be accomplished without causing appreciable reactions involving other groups. Where the alkanoic acid is acetic acid, the hydrogenation reaction stops when all of the epoxy groups have reacted. Where an alkanoic anhydride is used, the absorption of hydrogen becomes comparatively very slow when all of the epoxy groups have reacted. The use of the alkanoic anhydrides as the reaction medium is particularly advantageous for the direct production of an alkanoxy compound.

While, as will be apparent to those skilled in the art, the hydrogenation can suitably be terminated before all of the epoxy groups present have reacted, it is preferred to carry the hydrogenation to completion. In general, complete hydrogenation is obtained in from about 0.5 to about 6 hours.

The hydroxy compounds produced are preferably isolated by removing the catalyst by mechanical means and removing the acid or anhydride used by conventional separation procedures.

The following examples are illustrative of the invention.

Example I

Epoxidized methyl oleate having an epoxy oxygen content of 5.02 percent was mixed with two parts by weight of acetic acid. A catalyst, consisting of powdered activated charcoal impregnated with 10% of its weight of finely divided palladium, was dispersed throughout the the mixture. Hydrogen was admitted into the suspension at 30 lbs. pressure while the suspension was maintained with agitation at a temperature of about 25° C. Within 45 minutes the stoichiometric amount (calculated from pressure drop of hydrogen) was absorbed. The catalyst was filtered off and the reaction product was isolated by pouring the filtrate into cold water. After filtering and drying, the product was found to consist of 95.3% methyl 10-hydroxystearate (the identity of the product was established by chromic acid oxidation to the corresponding keto ester followed by saponification and characterization and identification of the free acid by means of the semicarbazone).

Example II

The hydrogenation of another portion of the same epoxidized methyl oleate was carried out exactly as described in Example I. The recovery of the product and of the acetic acid was effected by fractional distillation under reduced pressure.

Example III

Pure 9,10-epoxystearic acid (obtained from oleic acid) was hydrogenated as described in Example I. 10-hydroxystearic acid was recovered from separate portions of the reaction medium by the processes of Examples I and II.

Example IV

Methyl 9,10-epoxy stearate (obtained from methyl elaidate) was hydrogenated as described in Example I. The product was recovered and identified in the same manner as described in Example I. This product was also identified to be 10-hydroxystearate.

Example V

Pure 9,10-epoxy stearic acid (obtained from elaidic acid) was hydrogenated as described in Example I. 10-hydroxystearic acid was recovered from separate portions of the reaction medium by the processes of Examples I and II.

Example VI

Commercial oleic acid containing approximately 25% elaidic acid and 60% oleic acid was converted into an n-proply ester and subsequently epoxidized with peracetic acid. This reaction mixture per se was then hydrogenated using the palladium catalyst described in Example I and 30 lbs. hydrogen pressure. The acetic acid was removed by fractional distillation. The saponification of the resulting product produced 10-hydroxystearic acid in a yield of 70%.

Example VII

Commercial oleic acid was epoxidized, hydrogenated and the reaction product recovered in the same manner as described in Example VI. Saponification produced 10-hydroxystearic acid.

Example VIII

Pure methyl 9,10-epoxy stearate (obtained from methyl oleate) was hydrogenated under the conditions described in Example I except that acetic anhydride was used in the place of acetic acid. After removal of the acetic anhydride by distillation, the resulting product was found to consist chiefly of the methyl ester of 10-acetoxystearic acid.

Example IX

Pure methyl 9,10,12,13-di-epoxystearate (obtained from pure methyl linoleate) was hydrogenated under the conditions set forth in Example I. The corresponding methyl di-hydroxystearate was recoved by fractional distillation. Saponification of the ester led to the formation of the corresponding dihydroxystearic acid.

We claim:

1. A process of selectively hydrogenating epoxy groups of an epoxidized compound of the group consisting of acids and esters that, prior to expoxidation, contained at least one olefinically unsaturated aliphatic radical of at least 4 carbon atoms to hydroxyethylene groups which process comprises: forming a solution of the epoxidized compound with a liquid of the group consisting of liquid alkanoic acids containing from 2 to 5 carbon atoms, liquid alkanoic acid anhydrides containing from 2 to 5 carbon atoms, and mixtures thereof; and contacting the resultant solution with hydrogen in the presence of palladium dispersed on carbon particles suspended in the solution as a catalyst until reaction occurs.

2. The process of claim 1 wherein the epoxidized compound is epoxidized methyl oleate and the liquid is acetic acid.

3. The process of claim 1 wherein the epoxidized compound is epoxidized methyl oleate and the liquid is acetic anhydride.

References Cited in the file of this patent

UNITED STATES PATENTS

| 2,524,096 | Wood | Oct. 3, 1950 |

FOREIGN PATENTS

| 496,264 | Great Britain | Nov. 25, 1938 |